United States Patent [19]
Mashiko

[11] Patent Number: 6,106,344
[45] Date of Patent: Aug. 22, 2000

[54] EXHAUST SYSTEM FOR WATERCRAFT

[75] Inventor: Tetsuya Mashiko, Shizuoka, Japan

[73] Assignee: Yamaha Hatsudoki Kabushiki Kaisha, Shizuoka, Japan

[21] Appl. No.: 09/105,543

[22] Filed: Jun. 26, 1998

[30] Foreign Application Priority Data

Jun. 26, 1997 [JP] Japan ................................. 9-170351

[51] Int. Cl.[7] .................................................. B63H 21/32
[52] U.S. Cl. .............................................................. 440/89
[58] Field of Search ........................................ 440/88, 89

[56] References Cited

U.S. PATENT DOCUMENTS

5,324,217  6/1994  Mineo ........................................ 440/89
5,366,401  11/1994  Nanami et al. .
5,632,660  5/1997  Nakase et al. ............................ 440/89

*Primary Examiner*—Stephen Avila
*Attorney, Agent, or Firm*—Knobbe, Martens, Olson & Bear, LLP

[57] ABSTRACT

An improved exhaust system for a marine engine utilizes a catalyst positioned within the exhaust system to maximize engine performance while minimizing the deterioration of catalyst. The exhaust system includes an exhaust manifold, an expansion chamber, a water trap and an exhaust pipe connecting the expansion chamber to the water trap. The exhaust pipe includes a catalyst chamber that houses the catalyst in such a way as to minimize the collection of water in the catalyst chamber as well as to inhibit a back flow of water to the catalyst chamber. The expansion chamber and the exhaust pipe are preferably fixed to the body of the engine to reduce vibration generated by the passage of the exhaust gases through the exhaust system.

33 Claims, 7 Drawing Sheets

EXHAUST SYSTEM FOR WATERCRAFT

BACKGROUND OF THE INVENTION

1. Field of the Invention

The present invention relates in general to an engine, and more particularly to an exhaust system for a marine engine.

2. Description of Related Art

Personal watercraft have become popular in recent years. This type of watercraft is sporty in nature; it turns swiftly, is easily maneuverable, and accelerates quickly. Personal watercraft today commonly carry one driver and one or two passengers and include a hull which defines an interior engine compartment for housing an engine. The output shaft of the engine is coupled to a water propulsion device of the watercraft, such as a jet propulsion unit. An internal combustion engine is commonly used to power the personal watercraft. Typically, the engine is an in-line, multi-cylinder, two-cycle engine.

An exhaust system communicates with the cylinders of the engine and extends to a discharge that is located near the stem of the watercraft. In this manner, exhaust gases are expelled from the watercraft. To improve engine performance, the engine exhaust system includes an expansion chamber that has a larger diameter than the exhaust pipe in which it is located. The expansion chamber serves to improve engine efficiency by creating return shock waves that regulate the exhaustion of gases out of the compression cylinders following combustion. The expansion chamber often includes a diffuser cone and a convergent cone, both of which provide a size transition from the smaller diameter exhaust pipe to and from the expansion chamber.

Because the exhaust gases may cause air and/or water pollution, a catalyst comprising suitable catalytic materials is housed within the exhaust gas passage of the exhaust system to reduce harmful emissions. The effectiveness of the catalytic materials generally increases with the volume of the catalyst. It has been previously proposed to house the catalytic materials in the expansion chamber. However, housing the catalyst in the expansion chamber reduces the net space of the expansion chamber, which reduces the advantage of having an expansion chamber. The problem is that the catalyst interferes with the force and speed of the return shock wave created by the passage of exhaust gases through the diffuser and convergent cones within the expansion chamber. Formation of the return shock wave enhances performance of the two-stroke engine and the catalyst may adversely inhibit return shock wave formation.

A need, therefore, exists to improve the structure of the exhaust system that will not deteriorate the engine performance while maintaining the catalyst within the exhaust system.

SUMMARY OF THE INVENTION

The present invention comprises an exhaust system for use with an internal combustion engine used in a personal watercraft. The exhaust system comprises an exhaust manifold and an expansion chamber connected to the exhaust manifold. A water trap device minimizes back flow of water, and an exhaust pipe connects the expansion chamber to the water trap device. The expansion chamber includes a diffuser cone having a tapered interior diameter that increases in a downstream direction and a convergent cone (downstream from the diffuser cone) having a tapered interior diameter that decreases in a downstream direction. The exhaust pipe includes a catalyst chamber defined by a catalyzer housing for enclosing catalytic material within the chamber. The catalyst chamber is desirably positioned within the exhaust system to be at a level above the water trap device so as to minimize the inadvertent back flow of water into the catalyst chamber.

Further aspects, features, and advantages of the present invention will become apparent from the detailed description of the preferred embodiment that follows.

BRIEF DESCRIPTION OF THE DRAWINGS

The above-mentioned and other features of the invention will now be described with reference to the drawings of a preferred embodiment of the present exhaust system for a watercraft. The illustrated embodiment is intended to illustrate, but not to limit the invention. The drawings contain the following figures.

DETAILED DESCRIPTION OF A PREFERRED EMBODIMENT OF THE INVENTION

The present engine exhaust system has particular utility for use with a personal watercraft, and thus, the following describes the engine exhaust system in the context of a personal watercraft. This environment of use, however, is merely exemplary. The present engine exhaust system can be readily adapted by those skilled in the art for use with other types of watercraft as well, such as, for example, but without limitation, small jet boats and the like, as well as for use in other applications.

Before describing the present invention, an exemplary personal watercraft 10 will first be described in general detail to assist the reader's understanding of the engine and the inventive exhaust system described herein. The watercraft 10 is suited for movement through a body of water toward a front end or bow of the watercraft 10.

Figure 1:
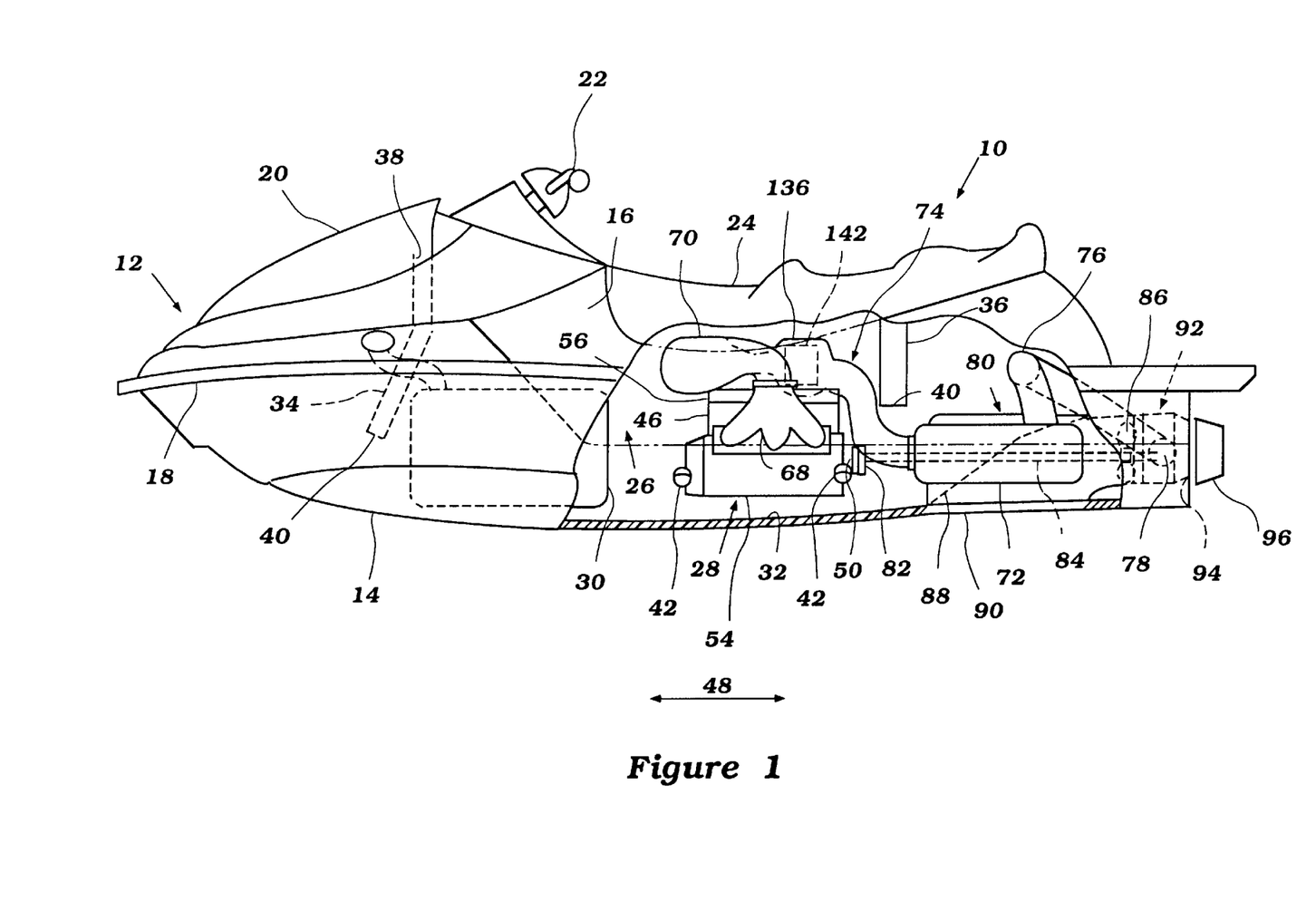
FIG. 1 is a side elevational view of an embodiment of the present invention showing a watercraft partially sectioned to illustrate an interior engine compartment that houses an engine and an exhaust system configured and arranged in accordance with the present invention.

As illustrated in FIG. 1, the watercraft 10 includes a hull 12 formed by a lower section 14 and an upper deck section 16. The hull sections 14, 16 are formed from a suitable material such as, for example, a molded fiberglass-reinforced resin. The lower hull section 14 and the upper deck section 16 are fixed to each other around the peripheral edges 18 in any suitable manner.

As viewed in the direction from the bow to the stem of the watercraft 10, the upper deck section 16 includes a bow portion at the front of the watercraft, a control portion extending rearwardly therefrom, and a seating area positioned aft of the control portion. The bow portion slopes upwardly toward the control portion and includes an opening (not shown) for access to the inside of the watercraft hull 12. A hatch or lid 20, which covers the opening to inhibit an influx of water into the hull 12, also slopes upwardly to the control portion.

The control portion extends rearwardly from the bow portion and includes a display of meters (not shown) and a handlebar assembly 22. The handlebar 22 controls the steering of the watercraft 10 in a conventional manner. Although not illustrated, the handlebar assembly 22 also carries a variety of watercraft controls, such as, for example, a throttle control, a start switch and a lanyard switch.

The seating area comprises an operator/passenger seat 24 detachably mounted longitudinally along the center of the watercraft that may be straddled by an operator and by one or two passengers. The middle position of the operator on the watercraft provide fore and aft balance when the operator rides alone. The seat 24 is desirably removable to provide access to an opening in the upper deck to an engine compartment 26. The seat 24 is attached to the upper deck section 16 around the access opening by a known latching mechanism.

The engine compartment 26 is formed in the hull 12 of the personal watercraft 10 to house an internal combustion engine 28 and other peripheral systems such as an air supply system, a fuel supply system, and an exhaust system. The engine 28 is desirably mounted in approximately a central position in the watercraft 10 and beneath the access opening (not shown) located on the upper deck section 16. A fuel tank 30 and a buoyant block (not shown) are located in a forward portion of the engine compartment 26 within the hull 12. The fuel tank 30 is mounted to a bottom surface 32 of the hull 12 using a plurality of fuel tank mounts (not shown). The buoyant block affords additional buoyancy to the watercraft 10.

An air supply system ventilates the engine compartment 26 by supplying fresh air thereto. Such an air supply system desirably includes at least one air duct, and preferably at least two. For example, one air duct 34 is located toward a forward section of the engine compartment 26 while another air duct 36 is provided toward a rearward section of the engine compartment 26. Both ducts 34, 36 include an air inlet opening 38 at an upper end that extends up into the upper deck section 16 and a lower outlet opening 40 that terminates above the bottom surface 32 of the engine compartment.

A plurality of engine mounts 42 secure the engine 28 to the lower surface 32 of the hull 12 and support the engine 28 within the engine compartment 26 of the watercraft 10. Each engine mount 42 advantageously comprises a pad constructed from rubber or a similar vibration dampening and isolating material. The engine mounts 42, with shock-absorbent pads, dampen engine vibrations, as well as reduce the impact felt by engine components as the hull 12 of the watercraft 10 bounces on the surface of the water in which the watercraft 10 is used, when in use.

Figure 3:
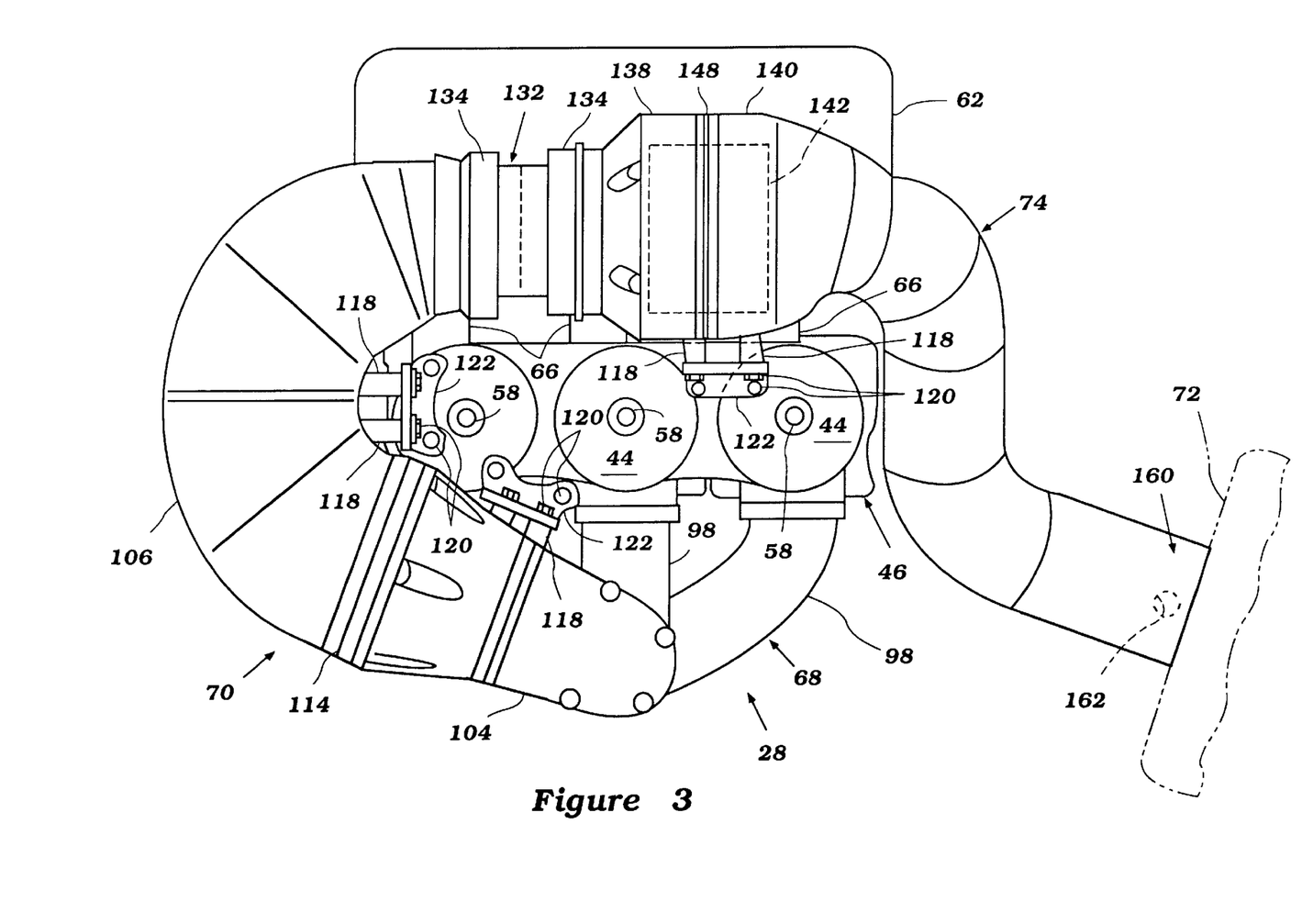
FIG. 3 is a partial top plan view of the engine and the exhaust system of FIG. 1, and illustrates the mounting arrangement of the exhaust system to the engine.
Figure 5:
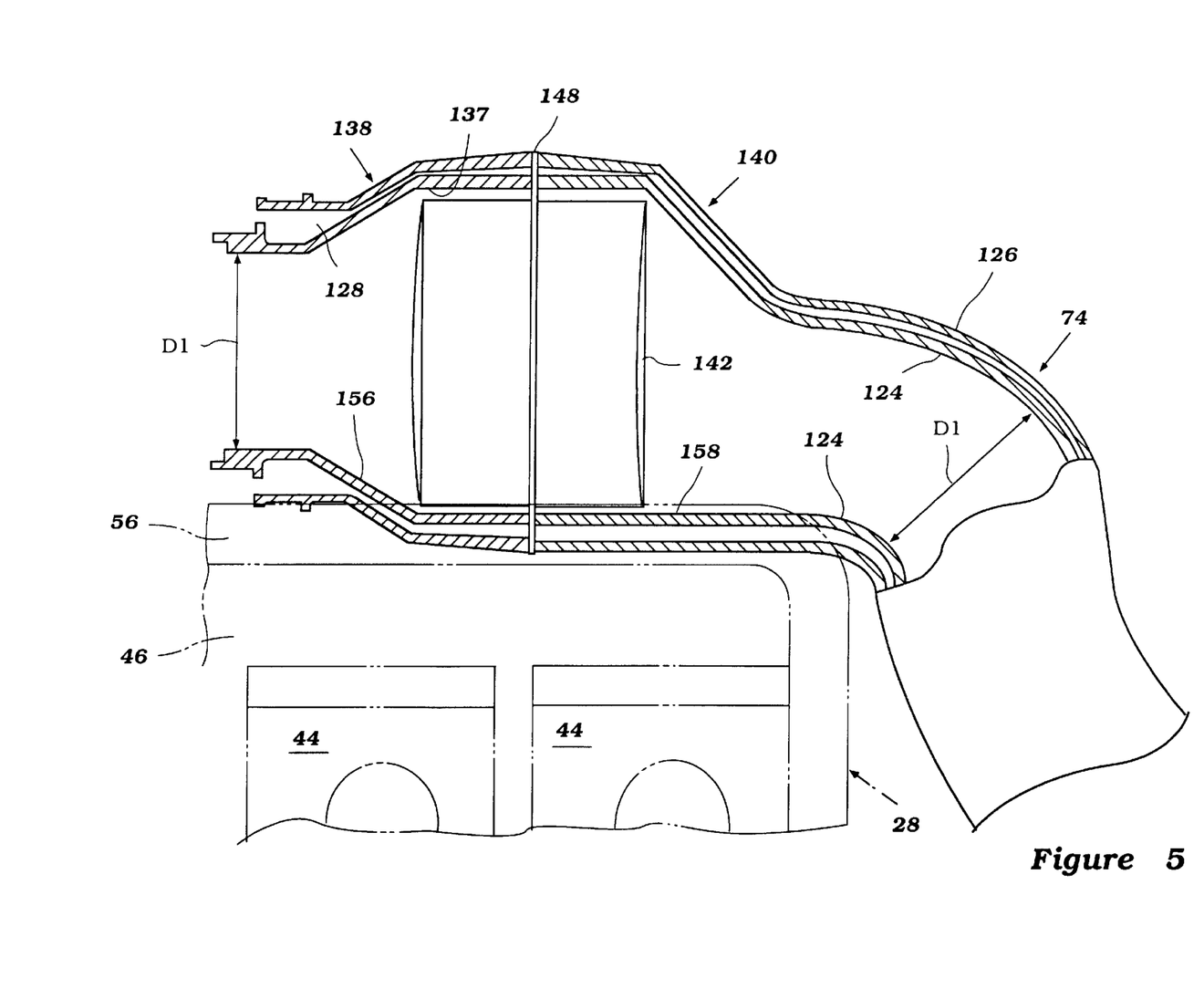
FIG. 5 is a partial sectional side elevational view of the exhaust system of FIG. 1 is a with a portion of the engine illustrated in phantom.

As shown in FIGS. 3 and 5, the engine 28 advantageously includes a plurality of in-line cylinders 44 positioned substantially vertically and operates on a two-cycle principle. Other types of engines, which have other configurations and operate on other principles (e.g., four cycle), can also be used with the present exhaust system. The engine 28 is positioned such that the row of cylinders 44, which forms a cylinder block 46, lies parallel to a longitudinal direction 48 of the watercraft 10, running bow to stem. While the engine 28 typically extends substantially longitudinally, it may also be arranged with an output shaft thereof oriented generally in a lateral direction. A crankcase is located beneath the cylinder block 46 and defines a plurality of crank chambers (not shown) underneath the cylinders. On the upper end of the cylinder block 46, a cylinder head 56 is provided to enclose the combustion chambers (not shown) below it. A spark plug 58 is mounted on top of each recess (not shown) of the cylinder head 56 and has its gap extending into the combustion cylinders. The spark plugs 58 are fired by an ignition control unit that is controlled by an electronic control unit (not shown) of the engine 28. Preferably, the spark plugs are protected, at least partially, by the exhaust system that encircles the engine, as described further below.

Figure 6:
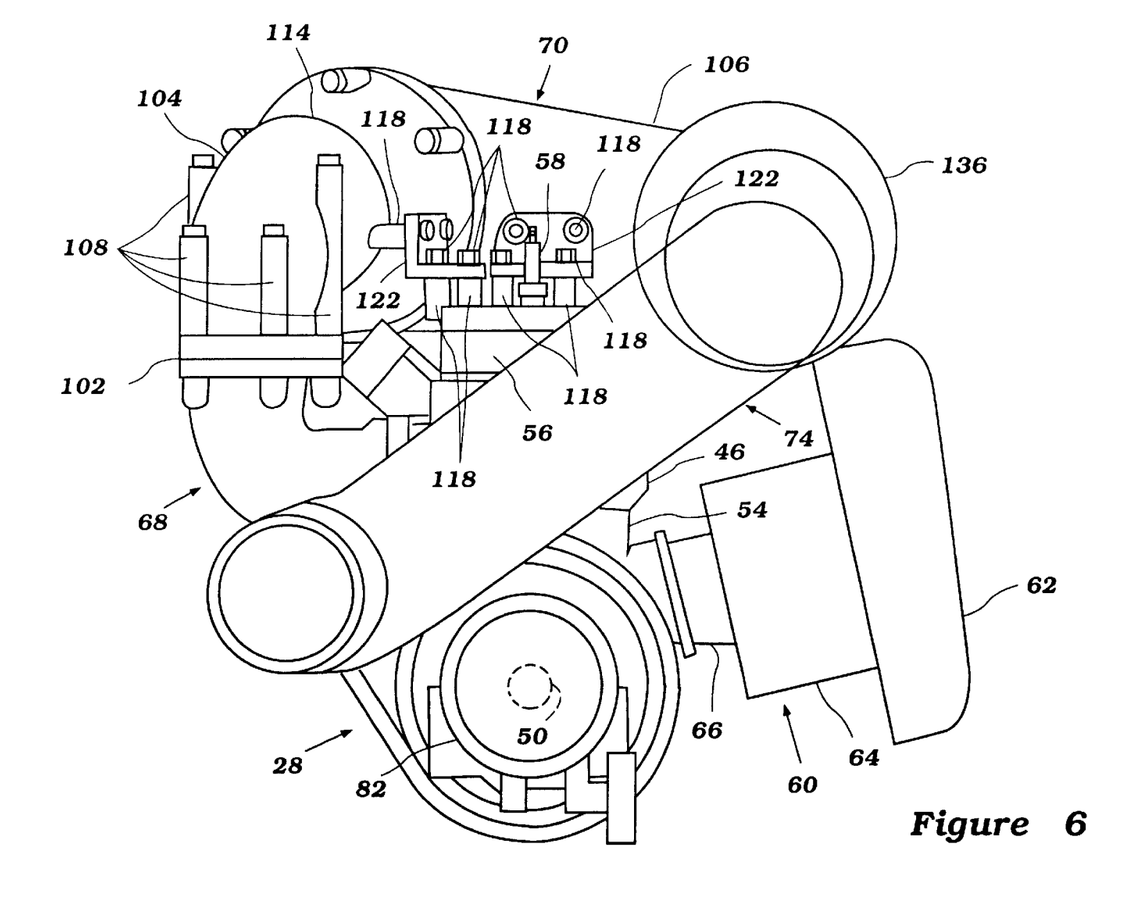
FIG. 6 is a rear elevational view of the engine and the exhaust system of FIG. 1.

FIG. 6 shows an air intake or induction system 60 which supplies an air charge to the cylinders of the engine 28. Air is received through an air intake silencer 62 which is located above and to the side of the cylinders 44. The air intake silencer 62 communicates with a carburetor 64 and a plurality of air intake pipes 66, each of which houses a butterflytype throttle valve (not shown) therewithin. Preferably, each cylinder is fed through a separate air intake pipe.

Although not illustrated, a fuel supply system of the engine 28 desirably includes a fuel pump, a fuel rail, fuel injectors, and interconnecting pipes therebetween. Fuel is transferred from the fuel tank 30 to the fuel pump, which supplies fuel to the fuel rail at a positive superatmospheric pressure. The fuel pump can be either mechanically or electrically driven. The fuel rail directs fuel into each fuel injector that is in communication with a combustion cylinder. The fuel system in the alternative can include one or more carburetors to form the fuel/air charge delivered to the engine.

Figure 2:
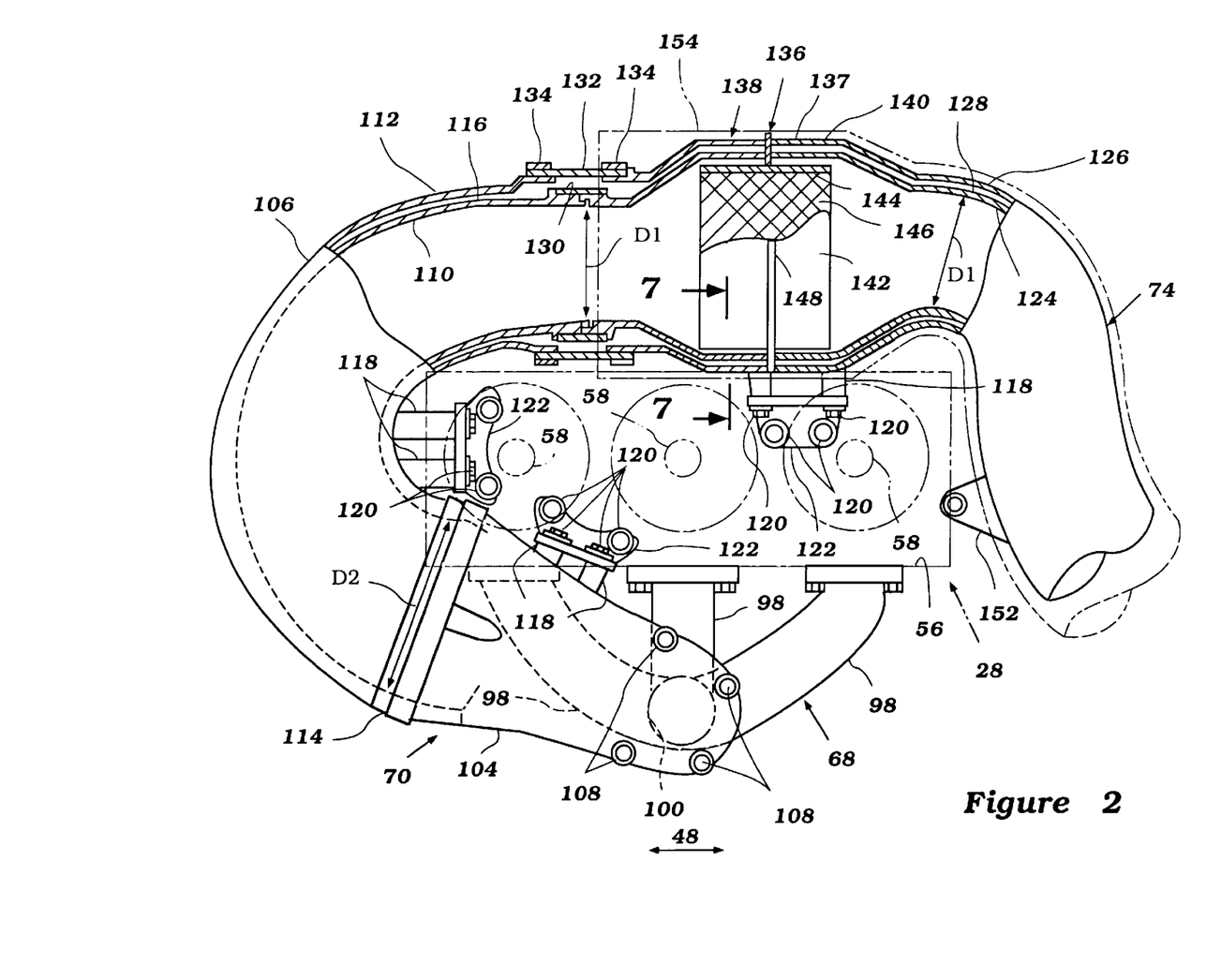
FIG. 2 is a partial top plan view of the engine and the exhaust system of FIG. 1, with a portion of the exhaust system shown in section to reveal the interior thereof.

As shown in FIG. 1, an exhaust system is provided to discharge exhaust gases from the engine 28 to the atmosphere and/or to the water. In general terms, the exhaust system includes an exhaust manifold 68, which is affixed to the side of the cylinder block 46, and an expansion chamber 70, through which exhaust gases pass from the exhaust manifold 68. The expansion chamber 70, in turn, communicates with a water trap device 72 through a first exhaust pipe 74 whereby the outlet end of the expansion chamber adjoins the inlet end of the first exhaust pipe. The water trap device 72 inhibits the back flow of water into the first exhaust pipe 74. A second exhaust pipe 76 fluidly connects the water trap device 72 to a discharge opening 78. The second exhaust pipe 76 extends up and over a jet propulsion unit 80 located at the aft of the watercraft. The varied elevation of exhaust pipe 76 further inhibits the influx of water into the exhaust system. As shown in FIGS. 2 and 5, the exhaust system preferably encircles and is positioned above, at least partially, the engine 28. In particular, it is preferred that the expansion chamber be positioned, at least partially, above the level of the cylinder head 56. By encircling the engine, the exhaust system affords some protection against water in the engine compartment inadvertently splashing against the spark plugs during use of the watercraft. A more detailed description of the exhaust system follows below.

At the rear of the engine 28, a coupling 82 interconnects the engine output shaft (e.g., crankshaft) 50 to a jet propulsion unit 80. The output shaft rotates about a rotational axis in which, in the preferred embodiment, a portion of the first exhaust pipe 74 is positioned on one side of the rotational axis and at least a portion of the expansion chamber having its maximum diameter D2 (and thereby maximum cross-sectional flow area) positioned on the other side of the rotational axis.

The jet propulsion unit 80 comprises an impeller shaft 84 (shown in phantom) that drives an impeller 86. A bearing assembly (not shown), which is secured to the bulkhead, supports the impeller shaft 84 behind the shaft coupling 82. The jet propulsion unit 80 is positioned at the aft center of the lower hull section 14 and desirably includes a gullet 88 having an inlet opening 90 formed on the bottom side of the lower hull section 14. The gullet 88 extends from the inlet opening 90 to a pressurization chamber 92 that, in turn, communicates with a nozzle section 94 of the propulsion unit 80.

The impeller 86 of the jet propulsion unit 80 pressurizes the water within the pressurization chamber 92 and forces the pressurized water through the nozzle section 94 of the jet propulsion unit 80. A steering nozzle 96 controls the direction of the water stream exiting the jet propulsion unit 80. The steering nozzle 96 is pivotally supported at the rear of the jet propulsion unit 80 to change the thrust angle on the watercraft 10 for steering purposes, as is known in the art. The steering nozzle 96 is connected to the steering s handlebar 22, which desirably also includes a throttle trigger for controlling the throttle valves of the air intake system 60 to regulate the speed of the engine 28.

The impeller 86 is located toward the front end of the pressurization chamber 92. A central support (not shown) supports the rear end of the impeller shaft 84 behind the impeller 86 and generally at the center of the pressurization chamber 92. A bearing assembly (not shown) journals the rear end of the impeller shaft 84 within the support.

A water removal assembly (not shown) can be provided within the engine compartment 26. Desirably, the water removal assembly is a bilge system (not shown). The bilge system generally employs a conduit (not shown) which is in fluid communication with a portion of the nozzle section 94 of the jet propulsion unit 80. The conduit is connected to a bilge inlet or water pickup (not shown) provided in the engine compartment 26 adjacent to the engine 28 and near the bottom surface 32 of the lower hull section 14. Due to the high rate of water flow through the nozzle section 94, a venturi effect is created in the bilge system conduit, which draws water from the engine compartment through the conduit and into the nozzle section.

Alternatively, the bilge system can be equipped with a pump (not shown) that pumps water from the bilge region of the hull 12 to the conduit. The water is then forced through the conduit to an outlet (not shown) located near the stern of the watercraft 10. For example, the water may be expelled through an outlet located in a wall of the gullet 88.

Figure 4:
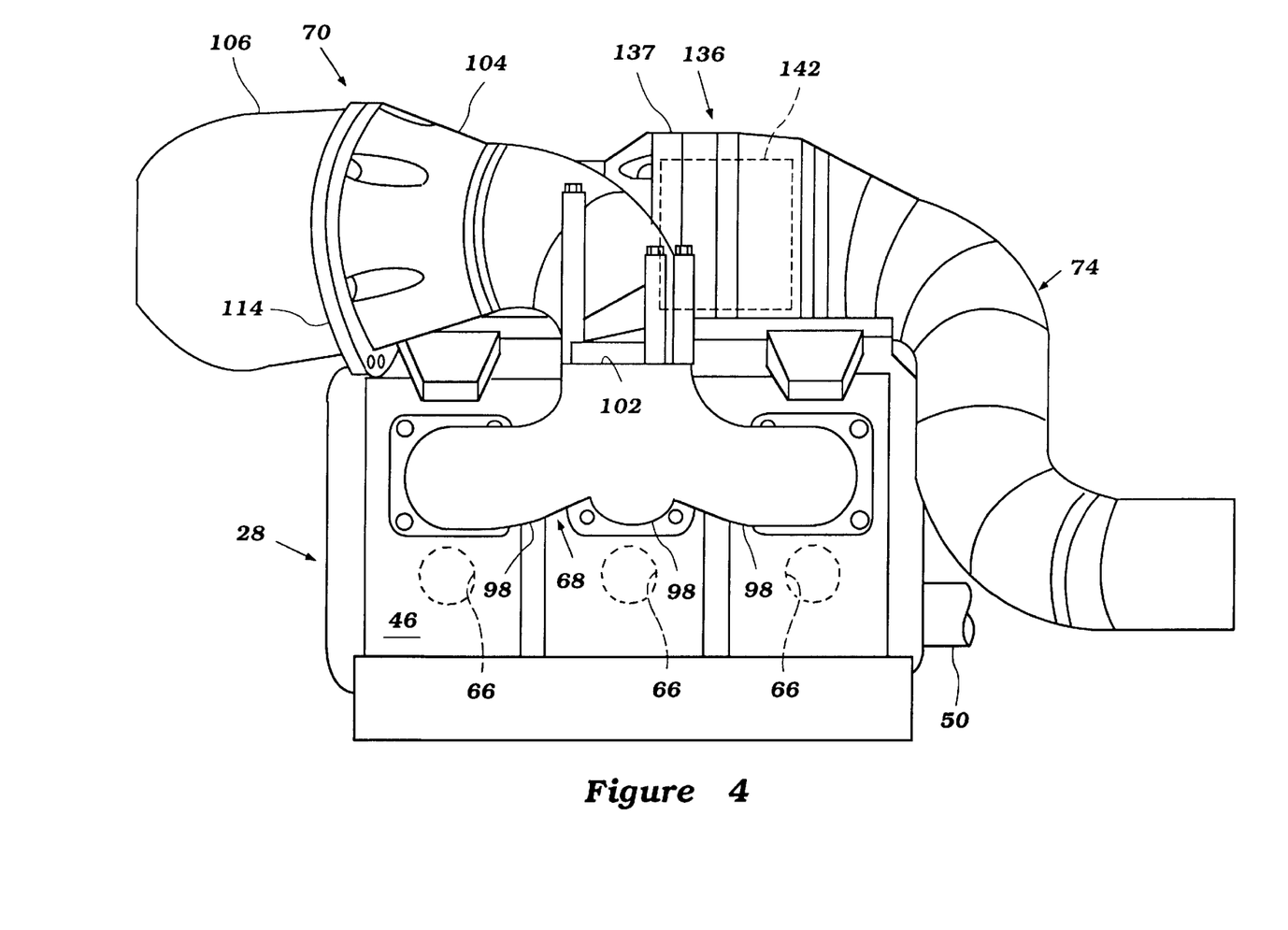
FIG. 4 is a side elevational view of the engine and the exhaust system of FIG. 1.

With reference to FIGS. 2 through 7, the exhaust system, which is configured in accordance with a preferred embodiment, is described. With reference initially to FIGS. 2, 3 and 4, the exhaust manifold 68 comprises individual exhaust branch pipes 98, each of which extend outwardly from an exhaust port that communicates with one cylinder 44 in the cylinder block 46 to a merge portion 100 of the manifold 68. The merge portion 100 extends upward to an exhaust manifold outlet 102 (FIG. 4).

The outlet of the exhaust manifold 68 communicates with the expansion chamber 70, which includes an upstream section 104 and a C-shaped downstream section 106. The upstream section 104 is directly connected to the outlet 102 of the exhaust manifold 68 with bolts 108, and extends upward and forward (askew from the longitudinal direction 48) therefrom. The upstream section 104 connects to the C-shaped downstream section 106 of the expansion chamber 70 by way of a flanged connection. The upstream section 104 and the adjoining C-shaped downstream section each have an end flange that are matably secured together with bolts. The C-shaped downstream section 106 extends at least in part forward of the front portion of the cylinder block 46 and wraps around to extend rearward at a level above and opposite to the exhaust manifold 68. The expansion chamber 70 is also preferably positioned at a level higher than the cylinder head 56 of the engine 28.

The expansion chamber 70 includes an inner tube 110 and an outer tube 112, wherein the inner tube 110 forms a passage for the exhaust gases. The outer tube 112 surrounds the inner tube 110 to enclose a cooling system that, in one embodiment comprises a coolant jacket 116 between the inner and outer tubes 110, 112. The coolant jacket 116 covers at least a portion, if not all, of the expansion chamber 70.

The upstream section 104 of the expansion chamber 70 forms a diffuser cone that has an inner diameter that increases as it progresses downstream to join the C-shaped section 106. The inner tube 110 of C-shaped section 106 forms a convergent cone that has a maximum diameter D2 at its inlet end 114 and tapers decreasingly toward a downstream diameter D1. Although the present exhaust passage is described as having a generally circular cross-sectional shape, other cross-sectional flow area shapes are also possible.

The expansion chamber 70 includes a water inlet (not shown) for the coolant jacket 116 in communication with the pressurization chamber 92 of the jet propulsion unit 80. Water can be received from the propulsion unit 80 either directly or indirectly via a cooling jacket formed in the exhaust manifold and/or the engine.

As shown in FIGS. 2, 3 and 6, the upstream and downstream sections 104, 106 each have a pair of parallel bosses 118 horizontally protruding from their exterior surfaces toward the center of the cylinder block 46. In addition to the two pair of bosses 118 that extend horizontally from the expansion chamber 70, two other pairs of vertically-extending parallel bosses 118 protrude from the top of the cylinder head 56. Each of the bosses 118 has a threaded interior (not shown) to receive a bolt 120 therein. An L-shaped bracket 122 having two holes in each face connects a pair of horizontal bosses 118 to a corresponding pair of vertical bosses 118, in which bolts 120 are threaded into each boss 118 to secure the L-shaped bracket 122 thereto. In this manner, the expansion chamber 70 is rigidly attached to the engine 28 and supported thereby. Variations of this aspect of the preferred embodiment include having the vertical bosses 118 extending from the cylinder block 46 instead of the cylinder head 56, and also include varying the number, orientation, and location of the bosses and brackets.

As shown in FIGS. 2 through 5, the first exhaust pipe 74 is connected to the outlet of the C-shaped downstream section 106 of the expansion chamber 70. The first exhaust pipe 74 extends rearward at generally the same elevational level as the expansion chamber 70 for approximately the length of the engine, and then downward past the rear end of the cylinder block 46. The outlet end of the first exhaust pipe 74 connects to the water trap device 72 (not shown), as discussed above in connection with FIG. 1. Like the expansion chamber 70, the first exhaust pipe 74 also has a dual shell construction formed by an inner tube 124 and an outer tube 126 that surrounds the inner tube 124. The inner tube 124 defines an exhaust flow passage therethrough while the space between the inner tube 124 and the outer tube 126 forms a coolant jacket 128 covering at least a portion, if not all, of the exhaust pipe 74. The coolant jackets 116 and 128 surrounding the expansion chamber 70 and first exhaust pipe 74, respectively, are in fluid communication with each other. In the illustrated embodiment, the cooling jacket completely surrounds the exhaust flow passage; however, it need not in all applications. Those skilled in the art would be readily able to configure the cooling jacket to suit a particular application.

As shown in FIG. 2 specifically, flexible couplings 130, 132 connect the inner and outer tubes 110, 112 at the outlet of the C-pipe section 106 to the inner and outer tubes 124, 126 at the inlet end of the first exhaust pipe 74. The flexible couplings 130, 132 are advantageously made of a heat insulating material to avoid heat transfer between the inner and outer tubes 110, 112, 124, 126. A pair of binding bands 134 seals outer coupling 132 to prevent leaks between the expansion chamber 70 and the exhaust pipe 74.

As shown in FIGS. 2 and 5, the inner tube 124 at the inlet of the first exhaust pipe 74 has a diameter D1, which increases significantly to form a catalyzer assembly downstream of the inlet. The catalyzer assembly comprises a catalyzer housing 136 defining a catalyst chamber 137. Downstream of the catalyst chamber 137, the first exhaust pipe 74 returns to a diameter of approximately D1. In the preferred embodiment, the catalyzer housing 136 has an enlarged diameter relative to the outlet end of the expansion chamber, as indicated above, although a catalyzer housing having a diameter the same as or less than the outlet of the expansion chamber is also possible. The catalyst chamber is located proximate the outlet of the expansion chamber and preferably closer to the expansion chamber than to the water trap device 72. It is also preferable that the catalyst chamber be positioned, at least partially, forward of the rear end of the engine and above the cylinder head 56, as shown in FIGS. 2–5. The enlarged catalyzer housing 136 of the first exhaust pipe 74 has upstream and downstream housing sections 138, 140 joined at approximately the center of the catalyst chamber.

As shown in FIG. 2, the catalyzer assembly further comprises a catalyst 142 housed within the catalyst chamber 137 of the first exhaust pipe 74. The catalyst 142 includes an annular shell 144 supporting a honeycomb-type catalyst bed 146. The catalyst bed 146 is formed of a suitable catalytic material, such as that designed to treat and render harmless hydrocarbons, carbon monoxide, and oxides of nitrogen. Because catalytic materials used in engines generally require extreme heat to be effective, the catalyst chamber 137 is preferably located close to the expansion chamber 70, in which the temperature of the exhaust gases is higher than that in the first exhaust pipe 74.

Interposed between the upstream and downstream housing sections 138, 140 of the first exhaust pipe 74, the catalyzer assembly further comprises an annular flange 148 provided around the annular shell 144 to secure the catalyst 142 to the enlarged catalyzer housing 136. A plurality of holes (not shown) is formed through the flange to permit the passage of water from coolant jacket 116 to coolant jacket 128 (or vice versa). Locating the annular flange 148 between the upstream housing section 138 and the downstream housing section 140 facilitates the removal and exchange of catalyst 142 by disconnecting the upstream and downstream housing sections 138, 140.

As shown in FIGS. 2, 3 and 6, the upstream and downstream sections housing 138, 140 of the first exhaust pipe 74 are attached to the cylinder head 56 through an L-shaped bracket 122 in the same manner as the expansion chamber 70 is attached to the cylinder head 56. This rigid connection reduces the vibration of the first exhaust pipe 74. In the preferred embodiment, the upstream housing section 138 is connected via one set of bosses to the engine 28 while the downstream housing section 140 is also connected via a second set of bosses to the engine, as shown specifically in FIG. 2, wherein both the first and second set of bosses are secured through the same bracket 120. Also shown in FIG. 2, another bracket 152 connects a downstream portion of the first exhaust pipe 74 to the aft end of the engine 28.

Figure 7:
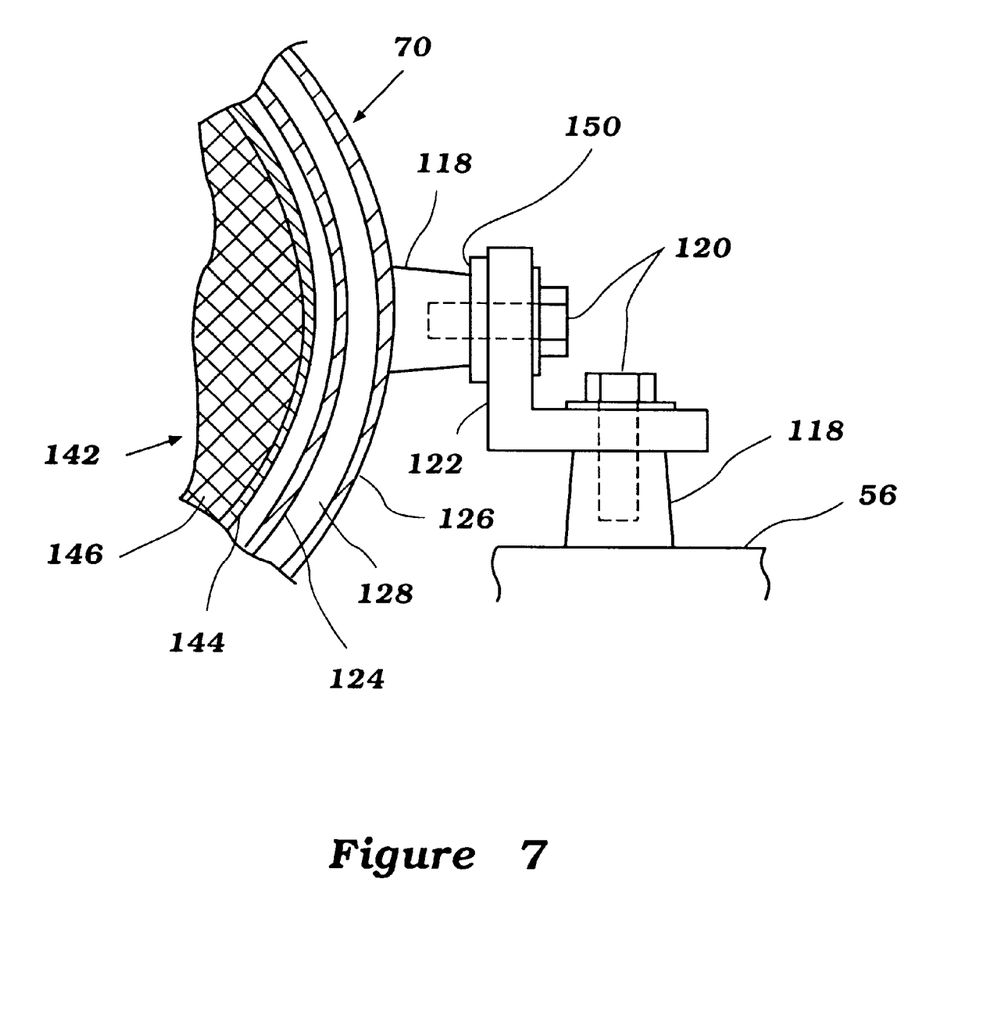
FIG. 7 is a partial sectional view of an exhaust system mount of the present invention taken through line 7—7 of FIG. 2.

With reference to FIG. 7, the brackets that connect the first exhaust pipe 74 to the engine preferably include a heat insulating washer 150 that can advantageously be inserted between the L-shaped bracket 122 and the bosses 118 protruding from the first exhaust pipe 74. The insulating washer 150 prevents the heat that dissipates from the higher temperature catalyst 142 within the enlarged catalyzer housing 136 from transferring to the engine 28. Such a heat insulating washer may be used on both the horizontal and vertical bosses 118, if desired. It may also be used on one or more of the bosses that attach the expansion chamber to the engine.

With reference back to FIG. 2, the first exhaust pipe 74 is preferably covered by an insulting cover 154 (shown in phantom) that is made of a heat insulating material. The heat insulating material 154 also reduces the heat transfer from the catalyst 142 to the engine 28. In addition, because the flexible couplings 130, 132 between the first exhaust pipe 74 and the expansion chamber 70 are made of a heat insulating material, no heat insulating cover is necessary around the expansion chamber 70.

As shown in FIG. 5, a lower wall 156 of the concentrically tapered enlarged catalyzer housing 136, upstream of the catalyst 142, provides a gravitational barrier to any water that may inadvertently back flow into the catalyst chamber 137 from entering the expansion chamber 70. This sloping lower wall 156 also inhibits the passage of any catalytic materials (that may drop from the catalyzer bed 146) back up into the expansion chamber 70, so as to maintain the full catalytic power of the catalyst 142.

Advantageously, the inner tube 124 of the exhaust pipe 70, downstream from the catalyst 142, tapers eccentrically in such a way that the lower surface is relatively level so as to prevent the collection of water within the catalyst chamber 137 that may inadvertently backwash thereinto. In contrast, the upper surface is substantially inclined and has a greater degree of incline than the lower surface with respect to the axis of flow through the catalyst chamber. Thus, under normal operating conditions, this lower surface is oriented either substantially horizontally, when the watercraft is at rest or moving slowly through calm waters, or inclined downwardly away from the catalyst chamber 137 when the watercraft is in motion with the bow projecting upward; i.e., up on plane. Any water that inadvertently back flows into the catalyst chamber 137 would, by gravity, wash immediately away from the catalyst 142 down the sloping downstream end of the first exhaust pipe 74. It is extremely important that as little water as possible, preferably no water, come into contact with the catalyst 142. Because it is maintained at such a high temperature, on the order of magnitude of approximately 1400° F., the catalyst 142 would fracture upon contact with the much cooler water. It is preferred that the catalyst 142 be positioned at least partially above the elevation of the cylinder head 56, as shown in FIG. 5.

As shown in FIG. 3, a water mixing portion 160 is provided in the first exhaust pipe 74 adjacent the water trap device 72, which is at a level lower than the catalyst chamber 137 in which the catalyst 142 is located. The water mixing portion 160 comprises a hole 162 formed in the inner tube 124 of the first exhaust pipe 74 that permits water flowing through the coolant jacket to be injected into the interior of the first exhaust pipe. The injection of water through the hole 162 reduces exhaust thundering noise.

Other configurations of the water mixing portion are contemplated. For example, in one alternative embodiment, the coolant jacket around the exhaust pipe 74 terminates at a distance from the water trap device 72. A water line, with a spray nozzle at the end, is sealably positioned in the wall of the exhaust pipe 74 between the coolant jacket and the water trap device 72 so as to forcibly inject water into the exhaust system. In another embodiment of the water mixing portion, the inner tube 124 terminates upstream from the termination of the outer tube 126 so that the water flowing through the coolant jacket empties circumferentially from the coolant jacket into the interior of the exhaust pipe 74. In still another embodiment, the inner tube terminates downstream of the outer tube 126 wherein the inner tube has one or more holes proximate to and upstream from the termination of the outer tube to permit the discharge of the coolant water into the exhaust pipe 74. It is contemplated that the water supply for the water mixing portion comes either from the same cooling system that feeds the coolant jacket or a separate independent cooling system.

Advantageously, because the catalyst 142 is housed within the catalyst chamber 137 of the first exhaust pipe 74, rather than within the expansion chamber, engine performance is enhanced. That is because the expansion chamber serves to enhance engine performance by having a convergent cone section and a diffuser cone section that together generate return shock waves in the exhaust gases passing through the expansion chamber. Those return shock waves act to regulate the exhaust gases expelled from the combustion cylinders, which increases efficiency in the combustion cycle. By eliminating the catalyst from the expansion chamber, formation of the return shock waves may take place without interference.

Furthermore, because the catalyst chamber 137 is located preferably close to the expansion chamber 70, the catalysts are more easily activated by the relatively hot exhaust gases, even immediately after the start-up of the engine 28.

Insulating materials used in the couplings 130, 132, the cover 154, and the washer 150 block the heat transfer from the first exhaust pipe 74 and prevent overheating of the engine 28. The tapered structures at both sides of the enlarged catalyzer housing 136 maintain the catalytic power of the catalyst 142 by avoiding water staying within the catalyst chamber 137. Further, since the water mixing portion 160 is located in a lower level than the catalyst chamber 137, water introduced into the exhaust gas passage in the portion 160 does not reach the catalyst 142 disposed within the catalyst chamber 137.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A exhaust system connectable to an engine of a watercraft comprising an exhaust manifold, an expansion chamber connected to the exhaust manifold, a water trap device inhibiting the back flow of water, and an exhaust conduit fluidly connecting the expansion chamber to the water trap device, said expansion chamber having a tapered interior diameter that decreases in a downstream direction, and said exhaust conduit including a catalyzer assembly that comprises a catalyzer housing defining a catalyst chamber therwithin, the catalyzer housing being disposed downstream of the expansion chamber and the catalyst chamber having a larger cross-sectional flow area than a downstream end of the expansion chamber.

2. The exhaust system of claim 1, wherein the catalyst chamber is located proximate the expansion chamber.

3. The exhaust system of claim 1, wherein the catalyzer assembly further comprises an annular shell within the catalyst chamber that retains catalytic materials within said annular shell.

4. The exhaust system of claim 1, wherein the exhaust conduit has an inner diameter smaller than an inner diameter of the expansion chamber.

5. The exhaust system of claim 1, wherein the expansion chamber comprises an inner tube and an outer tube, and the exhaust conduit comprises inner and outer tubes, both of said inner tubes being in fluid communication with each other and both of said outer tubes being in fluid communication with each other, the corresponding inner and outer tubes defining a coolant jacket therebetween.

6. The exhaust system of claim 5, wherein the exhaust conduit has an upstream section and a downstream section separable at the enlarged catalyzer housing, and the annular shell of the catalyzer assembly has an annular flange around the shell disposed between the upstream and downstream section, the annular flange having one or more holes therethrough.

7. The exhaust system of claim 1, wherein the expansion chamber and the exhaust conduit are connected by a flexible, heat-insulating coupling.

8. The exhaust system of claim 1, wherein the exhaust conduit is at least partially covered with a heat insulating material.

9. The exhaust system of claim 1 in combination with the engine, wherein the engine and the exhaust system are rigidly connected to each other via at least one L-shaped bracket.

10. The combination of claim 9, wherein the L-shaped bracket connects at least one boss on the engine and at least one boss on the exhaust system, and each of said bosses is internally threaded to receive a bolt therein.

11. The combination of claim 10 further comprising a heating insulating washer positioned between at least one of said bosses and the bracket.

12. The exhaust system of claim 1 in combination with the engine, wherein the engine and the expansion chamber of the exhaust system are rigidly connected to each other via at least one L-shaped bracket.

13. The exhaust system of claim 1 in combination with the engine, wherein the engine and the exhaust conduit of the exhaust system are rigidly connected to each other via at least one L-shaped bracket.

14. An exhaust system connectable to an engine of a watercraft comprising an exhaust manifold, an expansion chamber connected to the exhaust manifold, a water trap device inhibiting the back flow of water, and an exhaust conduit fluidly connecting the expansion chamber to the water trap device, said expansion chamber having a tapered interior diameter that decreases in a downstream direction, and said exhaust conduit including a catalyzer assembly that comprises an enlarged catalyzer housing defining a catalyst chamber therewithin, the downstream end of the enlarged catalyzer housing including a tapered portion having an upper wall surface and a lower wall surface in which the taper of the upper wall surface is greater than the taper of the lower wall surface.

15. The exhaust system of claim 14, wherein the lower wall surface is positioned substantially horizontally away from said catalyst chamber so as to minimize the collection of water in and about said catalyst chamber.

16. An exhaust system connectable to an engine of a watercraft comprising an exhaust manifold, an expansion chamber connected to the exhaust manifold, a water trap device inhibiting the back flow of water, and an exhaust conduit fluidly connecting the expansion chamber to the water trap device, said expansion chamber having a tapered interior diameter that decreases in a downstream direction, said exhaust conduit including a catalyzer assembly that comprises an enlarged catalyzer housing defining a catalyst chamber therewithin, the catalyzer housing being disposed downstream of the expansion chamber, and the catalyst chamber being positioned at an elevation higher than the water trap.

17. An exhaust system for a watercraft comprising an expansion chamber that includes a convergent section having an outlet end, a water trap device inhibiting the back flow of water, and a catalyzer assembly comprising a catalyst housing for housing a catalyst therein, said catalyst being positioned between the outlet end of the expansion chamber and the water trap device, and the outlet end of the expansion chamber having a cross-sectional flow area that is smaller than a cross-sectional flow area within the catalyst housing.

18. An exhaust system for a watercraft comprising an expansion chamber that includes a convergent section having an outlet end, a water trap device inhibiting the back flow of water, and a catalyzer assembly comprising a catalyst housing for housing a catalyst therein, said catalyst being positioned between the outlet end of the expansion chamber and the water trap device, the catalyst being enlarged compared to the outlet end of the expansion chamber.

19. The exhaust system of claim 18 further comprising an exhaust manifold in fluid communication with the expansion chamber.

20. The exhaust system claim 18 in combination with an engine powering a watercraft, wherein a lower surface of the enlarged catalyzer housing slopes downward in an aft direction when the watercraft is up on plane.

21. The exhaust system of claim 18, wherein the catalyzer is closer to the expansion chamber than to the water trap device.

22. The exhaust system of claim 18 in combination with an engine having an output shaft that extends beyond a rear end of the engine, at least a portion of the catalyzer housing being positioned forward of the rear end of the engine.

23. The exhaust system of claim 22 additionally comprising a cooling system that introduces cooling water into an exhaust stream through the exhaust system at a point between the catalyzer and the water trap device.

24. The exhaust system of claim 23, wherein the catalyzer is positioned at an elevated level relative to the water trap device and relative to the point at which the cooling system communicates with the exhaust stream through the exhaust system.

25. The combination of claim 22, wherein at least a portion of the catalyzer housing is attached to the engine.

26. The combination of claim 23, wherein a heat insulator is positioned between the enlarged catalyzer housing and the engine.

27. The combination of claim 22, wherein the catalyzer housing includes a fist upstream housing section and a second downstream housing section that together generally define a catalyst chamber which contains a catalyst bed therein, a flange that extends about the catalyst bed and is supported between the first and second housing sections, and each housing section is attached to the engine.

28. An engine for a watercraft having an exhaust system which comprises an expansion chamber that includes an outlet end and a section of maximum cross-sectional flow area, a water trap device inhibiting the back flow of water, and a catalyzer assembly comprising a catalyst housing containing a catalyst, said catalyst being positioned between the outlet end of the expansion chamber and the water trap device, the engine having an output shaft that extends beyond a rear end of the engine and rotates about a rotational axis, at least a portion of the catalyzer housing being positioned forward of the rear end of the engine, and the catalyst being positioned on one side of the rotational axis and at least the section of maximum cross-sectional flow area of the expansion chamber being positioned on the other side of the rotational axis.

29. The combination of claim 22, wherein the engine includes a cylinder head, and at least a portion of the catalyst and at least a portion of the expansion chamber lie at an elevated position relative to the cylinder head.

30. The combination of claim 29, wherein the engine includes at least one cylinder arranged so that a cylinder axis is disposed in a substantially vertical direction, and at least one spark plug coupled to the cylinder head and positioned between the elevated portions of the expansion chamber and the catalyzer.

31. The exhaust system of claim 18 in combination with a watercraft, the watercraft having a hull defining an engine compartment containing an engine therein, and the exhaust system being connected to the engine to receive exhaust gases from the engine and to expel the exhaust gases from the watercraft.

32. The combination of claim 31, wherein the exhaust system additionally includes an exhaust pipe that extends between the water trap device and an exhaust outlet near an aft end of the watercraft, and the exhaust pipe includes a section that extends above the water trap device.

33. A watercraft comprising an engine and an exhaust system connected to the engine, the exhaust system including an exhaust manifold, an expansion chamber connected to the exhaust manifold, a water trap device inhibiting the black flow of water through at least a portion of the exhaust system, and an exhaust conduit fluidly connecting the expansion chamber to the water trap device, the expansion chamber having a tapered interior diameter that decreases in a downstream direction, said exhaust conduit including a catalyzer assembly that comprises an enlarged catalyzer housing defining a catalyst chamber, the catalyst chamber being arranged so as to communicate with the expansion chamber, and the catalyzer housing being rigidly connected to the engine via at least one L-shaped bracket.

* * * * *

UNITED STATES PATENT AND TRADEMARK OFFICE
CERTIFICATE OF CORRECTION

PATENT NO.    : 6,106,344
DATED         : August 22, 2000
INVENTOR(S)   : Tetsuya Mashiko

It is certified that error appears in the above-identified patent and that said Letters Patent is hereby corrected as shown below:

<u>Column 12,</u>
Line 6, please change "a fist" to -- a first --
Line 52, please change "black flow" to -- back flow --

Signed and Sealed this

Sixteenth Day of July, 2002

*Attest:*

*Attesting Officer*

JAMES E. ROGAN
*Director of the United States Patent and Trademark Office*